(12) United States Patent
Arnote, Jr. et al.

(10) Patent No.: US 11,925,184 B2
(45) Date of Patent: Mar. 12, 2024

(54) METHOD AND SYSTEM FOR PROCESSING AN EXTRUDED FOOD MATERIAL

(71) Applicants: Marel, Inc., Lenexa, KS (US); Marel Further Processing B.V., Boxmeer (NL)

(72) Inventors: Kenneth Bruce Arnote, Jr., Lenexa, KS (US); Travis Michael Coblentz, Lenexa, KS (US); Mattheus Catharina Willems, Lenexa, KS (US); Johannes Martinus Meulendijks, Boxmeer (NL)

(73) Assignees: MAREL, INC., Lenexa, KS (US); MAREL FURTHER PROCESSING B.V., Boxmeer (NL)

( * ) Notice: Subject to any disclaimer, the term of this patent is extended or adjusted under 35 U.S.C. 154(b) by 940 days.

(21) Appl. No.: 16/818,040

(22) Filed: Mar. 13, 2020

(65) Prior Publication Data

US 2021/0282416 A1   Sep. 16, 2021

(51) Int. Cl.
*A22C 11/00* (2006.01)
*A22C 11/02* (2006.01)
*A22C 11/10* (2006.01)
*A23P 20/20* (2016.01)
*A23P 30/20* (2016.01)

(52) U.S. Cl.
CPC ...... *A22C 11/0245* (2013.01); *A22C 11/0209* (2013.01); *A22C 11/10* (2013.01); *A23P 20/20* (2016.08); *A23P 30/20* (2016.08); *A23V 2300/34* (2013.01)

(58) Field of Classification Search
CPC . A22C 11/0245; A22C 11/10; A22C 11/0209; A23P 20/20; A23P 30/30; A23V 2300/34

USPC ........................................................ 452/31
See application file for complete search history.

(56) References Cited

U.S. PATENT DOCUMENTS

| 3,115,668 A | 12/1963 | Townsend |
| 3,191,222 A | 6/1965 | Townsend |
| 3,926,303 A | 12/1975 | McCall |
| 4,233,709 A | 11/1980 | Smith et al. |

(Continued)

FOREIGN PATENT DOCUMENTS

| DE | 3614232 A1 | 1/1988 |
| DE | 102014105767 A1 | 10/2015 |

(Continued)

OTHER PUBLICATIONS

Extended European Search Report from corresponding EP Application No. EP20163129.8, dated Aug. 26, 2020.

(Continued)

*Primary Examiner* — Richard T Price, Jr.
(74) *Attorney, Agent, or Firm* — Workman Nydegger (57) ABSTRACT

A food-processing system having a metering pump for filling a casing with food material, a linker for forming links in the filled casing and depositing a linked strand on a conveyor, and a plurality of servo motors arranged to drive each of a plurality of driven components of the processing system. The food-processing system being implemented according to a two-step ramp-up method that enables increased control of a first end and a second end of the linked strand using a first speed, and enables faster processing of the linked strand between the ends at a second speed higher than the first speed.

12 Claims, 6 Drawing Sheets

(56) References Cited

U.S. PATENT DOCUMENTS

| | | |
|---|---|---|
| 5,085,612 A | 2/1992 | Muller |
| 5,163,864 A | 11/1992 | Burger et al. |
| 5,197,915 A | 3/1993 | Nakamura et al. |
| 5,354,229 A | 10/1994 | Markwardt et al. |
| 5,921,857 A | 7/1999 | Simpson |
| 5,951,391 A | 9/1999 | Hergott et al. |
| 6,056,636 A | 5/2000 | Cody et al. |
| 6,066,035 A | 5/2000 | Hergott et al. |
| 6,245,369 B1 | 6/2001 | Kobussen et al. |
| 6,290,591 B1 | 9/2001 | Hergott et al. |
| 6,467,668 B1 | 10/2002 | Basile, II et al. |
| 6,523,462 B1 | 2/2003 | Johnson et al. |
| 6,592,452 B1 | 7/2003 | Myers |
| 7,195,552 B1 | 3/2007 | Jonson et al. |
| 7,220,176 B2 | 5/2007 | Hartwick |
| 7,381,123 B2 | 6/2008 | Bachtle |
| 7,520,802 B1 | 4/2009 | Veldkamp et al. |
| 7,618,307 B2 | 11/2009 | Gladh |
| 8,342,916 B2 | 1/2013 | Simpson et al. |
| 8,795,038 B2 | 8/2014 | Fischer et al. |
| 8,894,473 B2 | 11/2014 | Bachtle |
| 9,044,030 B2 | 6/2015 | Nakamura et al. |
| 9,480,264 B2 * | 11/2016 | Schmid ............ A22C 11/0245 |
| 2004/0118302 A1 * | 6/2004 | Muller ............ A22C 11/0245 99/472 |
| 2011/0130082 A1 | 6/2011 | Knodel |
| 2013/0280996 A1 | 10/2013 | Bachtle |
| 2019/0116815 A1 | 4/2019 | Melchert et al. |

FOREIGN PATENT DOCUMENTS

| | | |
|---|---|---|
| EP | 1310171 A1 | 5/2003 |
| EP | 1430779 A1 | 6/2004 |
| WO | 9817119 A1 | 4/1998 |

OTHER PUBLICATIONS

Extended European Search Report from corresponding EP Application No. EP20163093.6, dated Sep. 11, 2020.

* cited by examiner

METHOD AND SYSTEM FOR PROCESSING AN EXTRUDED FOOD MATERIAL

FIELD OF THE DISCLOSURE

The disclosure relates to a food-processing system for extruding a food material into a casing material and forming a linked strand therefrom, including a method for implementing or operating the same. The food-processing system may be configured to operate individual components thereof in a synchronized manner using a plurality of servos that are geared together, in order to enable a two-step ramp-up method for adapting to varying material constraints throughout the process.

BACKGROUND

In the field of extruded food-processing, elongated strands of food material, such as sausages, are made using processing systems including high speed components or machines for extruding food material into an elongated casing. The filled casings are twisted to create a linked strand that is deposited in loops on moving hooks of a conveyor until a length of the elongated casing is exhausted and the casing is tied off and closed, prior to the process repeating in rapid succession. The resulting loops of the linked strands may be periodically removed or otherwise conveyed for further processing, for example by smoking and/or cooking.

Known food-processing systems are capable of creating tens of thousands of sausages per hour and require several driven components operating at high speeds and pressures, such as an emulsion pump controlling a meat or other food material flow through a stuffing tube, a rotating chuck or twister device, a linking device, a discharge horn and a conveyor. Maintaining appropriate control of the operation of these systems is a difficult task, not least due to the required combination of high speeds and pressures with relatively delicate materials, particularly because of the different speeds and operations of the individual components.

Existing systems are based on optimizing and coordinating the timing and function of separate motors and actuators for driving each component in order to set a base speed for the system. This is often done by determining an operating speed of a "master device," such as one of the emulsion pump or the linking device, that provides a low product-failure rate and using that speed as the base speed. The operating speeds of the remaining components are derived based on a desired size/weight of a resulting sausage link using a predetermined ratio or relationship of the component speed to the base speed or as a function of the base speed.

Ideally all motors and actuators of these devices start at the same time and run at the same speed to have the food material, the casing, and the twists coordinated at the right time for forming the first sausage link of a strand. Unfortunately, the overall speed of the system is limited by the front end of the process due to the processing constraints of the food material and casing. When the system initiates and ramps up to an ultimate end speed, the meat or other food material rapidly begins flowing out of the stuffing tube under high pressure and can burst the casing of a first link if the end speed is too high, or if the ramping up occurs too quickly.

The operating speed of the system also presents problems in discharging the first link of the strand from the linking device to the hooks of the conveyor. As a first end of the strand exits the linking device through the discharge horn at a high speed there is a tendency for the unsecured end of the strand to flail or collide against the hook and bounce off, often resulting in substantial delay and wasted material, as an operator is required to stop operation of the system and manually place the linked strand on the corresponding hook after discarding any material that has contacted the floor.

Similar problems occur for the last link in a strand at the backend of the process. The overall speed of meat or other food material flowing out of the stuffing tube into the casing can result in the formation of significant overpressure in the stuffing tube, such that when ending a cycle and retracting the stuffing tube from the last link of the casing, the remaining overpressure causes meat to leak out of the open ends. This last link then exits the linking device as an unsecured end of the strand and can again bounce against the hook and fall to the floor, causing further inefficiency and loss. Such losses can take the form of lost product, machine downtime, and wasted resources.

Variations in casings and food materials used for creating extruded links further exacerbate the limits of existing food-processing systems. Casings can vary in diameter, length and strength, sometimes unpredictably particularly with natural casings. As a result the entire system must be adjusted to an even lower base speed as a precautionary measure. With more watery-food material blends the leaking caused by an overpressure is also increased, further reducing the allowable processing speed of the system in order to prevent the loss of food material.

Prior art solutions for addressing these challenges have generally settled on a trial-and-error approach, where an operating speed that will not burst a particular casing or result in too much momentum in the unsecured ends of the strands is identified by repeated effort and applied uniformly as a base speed and a corresponding constant feed rate to all driven components of the system. This base speed is maintained throughout processing and must be manually adjusted for changes in the materials used.

Some improvement in mitigating the described material losses has been realized by adjusting a ramp-up time of different components and adding variable start times for individual components, but these improvements remain substantially limited by the processing needs of the ends of the strands, and have only nominally increased the base speed of the system. These improvements are further diminished due to the requirement of increased operator intervention and skill, as well as expensive controller systems that entail electrically coupling all of the components in the system together in a restrictive manner.

Some attempts have been made to address these challenges through modifications to existing systems, such as by using specialized hook mechanisms for more tightly securing to the linked strand or through the use of complicated calculations and controllers, but these complex and expensive reconfigurations fail to prove cost-efficient. The operating speeds of these costly and complex prior art systems remain severely constrained due to the need to adjust speed limits for all components of the system to reduce inefficiency and material losses occurring in the processing of the ends of a linked strand, such that the speed of each component is restricted throughout the process by the limitations inherent in processing the initial and final links of linked strand.

There is a need for a solution that can facilitate a higher processing speed and increased material throughput for extruding food material into a casing and forming a linked strand without causing losses of time or materials.

Further, there is a need for a cost-efficient solution that can be implemented without increasing the level of intervention required by an operator and that can be easily adapted to the requirements of different casings and food materials while maintaining efficiency relative to prior art methods and systems.

SUMMARY

It is an object of the current disclosure to provide an improved method and system for processing an elongated strand of food material. An object of the disclosure is to improve the speed of forming a linked strand of extruded food material without bursting a casing material or causing the linked strand to fall from a conveyor.

It is an object of the current disclosure to provide improved control and coordination of components in a method and system for processing an elongated strand of food material, without increasing supervisory demands on an operator.

Embodiments of the disclosure relate to a food-processing system having a separate servo motor for different driven components of the system, including at least a metering pump and a linker. The servo motors are geared together, and their individual operation is synchronized, such that the servo motors can run through a speed ramp-up uniformly and with high precision. The slope and amplitude of the ramp-up may be configured differently according to the requirements of different products or conveyor types employed by the system.

The metering pump may include a stuffing tube, a stuffer and/or a metering pump configured to supply an extruded food material to an open end of a casing material. The system may be configured for passing a filled casing material from the metering pump to the linker for the creation of individual links in the filled casing material. The linker may comprise a rotatable chuck configured for twisting the casing material and a plurality of pinching elements configured to pinch the casing material at a predetermined interval, resulting in the creation of the individual links due to a cooperating action of the pinching elements and the rotatable chuck on the filled casing material. The pinching elements may be mounted on linker belts configured on either side of the casing material, such that the linker belts convey the casing material strand through the linker while creating the individual links.

According to varying embodiments, the rotatable chuck and the linker belts may each be provided with separate servo motors, the servo motors geared together and synchronized with the servo motors of the other components of the system. Alternatively, the rotatable chuck may be provided with a variable-frequency drive motor separate from the servo motor of the linker belts.

The linker may further include a discharge horn configured to discharge the linked strand from the linker to a conveyor. The linker may create loops of linked material that are discharged onto corresponding hooks of the conveyor. In an embodiment, the discharge horn may rotate to facilitate the creation of the loops in the linked strand, such as by controlling an angle of discharge of the linked strand. The discharge horn may be provided with a separate servo motor, the servo motor geared together and synchronized with the servo motors of the other components of the system.

In embodiments, the conveyor may also be provided with a separate servo motor that may be geared together and synchronized with the servo motors of the other components of the system. In an embodiment, the servo motor of the conveyor may be configured to track the movement of the discharge horn using an encoder, such that the servo motor operates only when the discharge horn is in motion.

The conveyor may comprise a chain or a belt system including a plurality of hooks for receiving the linked material from the linker. According to varying embodiments, the conveyor may comprise a vertical conveyor with metal hooks, a horizontal conveyor with plastic hooks, a continuous oven chain conveyor with metal rod style hooks, or another suitable conveyor.

While servo motors have been individually added to food-processing systems in the prior art, using a separate servo motor for each of a plurality of driven components of a food-processing system, including at least a metering pump and a linker, has not been attempted or considered to provide any particular advantage in the prior art. Surprisingly, it has been discovered that the use of separate servo motors for each of a plurality of driven components according to the current disclosure unexpectedly facilitates an advantageous two-step ramp-up that is configurable for the individual requirements of different products and conveyor systems, and which avoids overpressure in the casing as well as flailing or bouncing of the ends of a strand.

A two-step ramp-up according to one embodiment includes a first ramp-up of at least the metering pump and the linker to a first speed in a synchronized manner for the beginning of a linked strand. This first speed is advantageously maintained during a first period, for example until a first end of the linked strand is discharged to the conveyor. Maintaining the first speed keeps a momentum of the first end at a controllable level for preventing flailing or bouncing of the first end of the linked strand off of the conveyor. A second ramp-up may commence from the first speed to a second speed higher than the first speed. The second speed is advantageously maintained during a second period allowing the system to run at higher speeds while processing subsequent links than would be possible when processing the first end of the linked strand.

While the first end of the linked strand tends to burst from the pressure of the metering pump or bounce or flail against the conveyor when using a short ramp-up or high operating speed according to the methods in the prior art, the embodiments of the current disclosure take advantage that subsequent links are restricted by the first end and the second end of the linked strand being restrained by the linker and/or the conveyor, such that the subsequent links are less susceptible to bouncing and/or falling from the conveyor and can be processed at higher speeds. Likewise, the pressure applied by the metering pump to the casing is stabilized after the initial extrusion of food material, such that the subsequent links are less susceptible to bursting.

The two-step ramp-up according to the current disclosure overcomes the limitations of processing the first end of the linked strand by allowing the system to fill the first end of the linked strand and discharge the first end of the strand to the conveyor without difficulty at a more controllable initial speed prior to increasing the speed of the system to a higher full speed.

The benefit of the two-step ramp-up of the components in the system may be advantageously increased by the second period being greater than the first period. This configuration of the first period and the second period may increase an overall throughput and speed of the processing system by increasing an average speed of the overall system for processing a given linked strand without compromising the reliability of the system.

In embodiments, a slope and an amplitude of the two-step ramp-up may be configured to be different for different products or conveyor systems.

The operation of at least the metering pump and the linker by separate servo motors that are geared together in a synchronized manner may further achieve the advantage that the weight of the links remain uniform, equal or substantially equal, throughout the two-step ramp-up as the speed goes from a stopped state to the initial speed and then up to the full speed and/or back down. Any change in speed may be applied uniformly and precisely to each servo motor such that every step of the system forming the linked strand is performed at an identical rate. The synchronization advantageously reduces operating requirements of the system and prevents the inefficiencies of trial-and-error approaches.

Similar advantages are realized when processing the second end of the linked strand which tends to be more difficult to control. The two-step ramp-up may provide a similar ramp-down, such that the processing system may be ramped down from the second speed to the first speed or a third speed less than the second speed. The first speed or the third speed can be advantageously maintained until the second end of the linked strand is discharged to the conveyor, facilitating a secure placement of the second end on the conveyor.

The ramp-down to the first speed or the third speed may also advantageously reduce the effect of an overpressure, such as may occur in the filled casing material or in the pressurized stuffing tube of the metering pump at the second end of the linked strand. As the speed ramps down, an overpressure of extruded food material against the casing and the stuffing tube may decrease, reducing the risk of leaks from the second end of the casing and the stuffing tube.

In an embodiment, the servo motor of the metering pump has surprisingly been shown to facilitate a near elimination of leaks due to overpressure by performing a slight run-back of the stuffing tube of the metering pump. In prior art systems without a servo motor, no similar advantage has been considered or would have been possible.

Using a variable-frequency drive motor as in the prior art, it is not possible to limit a run-back with sufficient accuracy, such that any attempt to do so would draw air into the stuffing tube which would then be forced into the first link of a new casing strand, which in turn results in an unacceptable degradation of product quality. Even in systems using a servo motor, the existing systems fail to consider any run-back or associated advantage at all, much less a high accuracy run-back, for example measured by a precise and/or predetermined number of gear teeth running backwards in the metering pump.

In one embodiment, the processing system may ramp-down further from the first speed to a stop in order to load a new casing or to facilitate another preparation step or intervention. Alternatively, the processing system may maintain the first speed, the third speed, or a fourth speed lower than the first speed after discharging the second end of the linked strand in order to begin processing a first end of a subsequent linked strand in the same manner described for the first end of the linked strand.

The two-step ramp-up according to the current disclosure advantageously allows the processing system to overcome the limitations of the first end of the linked strand bouncing or flailing by operating at two or more sustained speeds. The two-step ramp-up may eliminate the need for operator intervention for processing the first and second ends of a linked strand, prevents material from falling to the floor, prevents bursting the casing, and increases the overall speed capabilities and throughput of the system without compromising or adversely affecting reliability. Similarly, the increased control facilitated by the two-step ramp-up may allow a precise control of the interaction of the first end of the linked strand and the conveyor, such as through the precise selection of the number of links from the linked strand thrown onto a first hook.

The use of separate servo motors for each of a plurality of driven components of the system according to embodiments of the disclosure may enable additional advantages over prior art systems. In particular, advantages may be realized over existing systems in that the embodiments of the current disclosure do not require that the various components of the system be electrically coupled together. These benefits free operators from manufacturer-specific requirements of prior art systems, such as the use of proprietary software or manufacturer-specific input and compatibility requirements.

For example, in prior art systems a buffer system may be used wherein an encoder is placed between the conveyor and the discharge horn. The encoder accurately tracks movement of the discharge horn for guiding movement of the conveyor, improving synchronization of the conveyor and the discharge horn but resulting in empty portions of the conveyor or empty hooks between linked strands due to an operating gap between a second end of a first linked strand and a first end of a second linked strand. The operating gap possibly is due to a loading of a new casing such that the discharge horn continues movement prior to the first link reaching the discharge horn.

In embodiments, the separate servo motors may facilitate an accurate count of pitches of the linker movement and the conveyor movement based on the particular requirements of a given product type. In one embodiment, the number of pitches needed to account for an operating gap between a second end of a first linked strand and a first end of a second linked strand can be accurately calculated.

In an embodiment having a separate servo motor for the discharge horn, the calculated number of pitches may be used to halt or introduce a negative movement for the discharge horn to compensate for the operating gap prior to the conveyor, such that movement of the conveyor, which is based on the tracking of the discharge horn by the encoder, is prevented during the operating gap. The improved synchronization of the metering pump, the linker, the discharge horn and the conveyor advantageously eliminates the prior art drawback of gaps or empty hooks between linked strands, allowing for an increased volume of linked strands on the conveyor of 2% or 3% and a corresponding increase in throughput and efficiency without manual intervention by an operator.

An embodiment of the disclosure may provide an advantageously simple weight-calibration operation for the processing system. Prior art systems generally determine units of speed of the components based on one component, such as metering pump revolutions per minute (RPM) being used to determine the speed of other components based on calculated speed ratios for achieving a desired product weight. When a linked strand is weighed and determined to be underfilled, prior art systems are configured to adjust the metering pump speed and related ratios for additional components, requiring that the components be electrically coupled together.

In an embodiment of the current disclosure, the processing system may be configured to receive a measured weight of product from an operator and automatically adjust the metering pump speed at the metering pump servo motor to the correct weight based on the measured weight. This arrangement advantageously eliminates the need for electrically coupling the components of the processing system and reduces the management requirements of an operator while improving the accuracy of the product weight.

It is further realized that processing systems according to the current disclosure may be provided with a control unit for managing operation of the system and/or with sensor arrangements for monitoring operation of the system.

These and other features, aspects, and advantages of the present disclosure will become better understood regarding the following description, appended claims, and accompanying drawings.

The drawing figures are not necessarily drawn to scale, but instead are drawn to provide a better understanding of the components, and are not intended to be limiting in scope, but to provide exemplary illustrations. The figures illustrate exemplary configurations of food-processing systems and associated processing methods, and in no way limit the structures, configurations or functions of food-processing systems embodiments according to the present disclosure.

DETAILED DESCRIPTION OF VARIOUS EMBODIMENTS

A better understanding of different embodiments of the invention may be had from the following description read with the accompanying drawings in which like reference characters may refer to like elements.

While the disclosure is susceptible to various modifications and alternative constructions, certain illustrative embodiments are shown in the drawings and will be described below. It should be understood, however, there is no intention to limit the disclosure to the embodiments disclosed, but on the contrary, the intention is to cover all modifications, alternative constructions, combinations, and equivalents falling within the spirit and scope of the disclosure and defined by the appended claims.

It will be understood that, unless a term is defined in this patent to possess a described meaning, there is no intent to limit the meaning of such term, either expressly or indirectly, beyond its plain or ordinary meaning.

Although the exemplary embodiments of the disclosure are shown and described for processing food items of exemplary shapes and dimensions, the embodiments of the disclosure may also be adapted to accommodate different types, shapes, and sizes of items. Components of the food-processing system and related method steps may be configured as stand-alone devices or steps for addition to an existing processing line or may be readily adapted to be incorporated into another processing device or custom processing line.

For ease of understanding the disclosed embodiments of a food-processing system, directional terms are used to describe embodiments of the disclosure with respect to a feed direction of a food material and a casing material. The directions may be adapted for the intended purpose, while maintaining the relative movement and operation of the components.

The terms "first end" and "second end" are used in the described embodiments to describe terminal ends of a food item as those ends proceed in the feed direction for processing, and may vary in size or number of links depending on the food items being processed. Following processing of a first food item, a subsequent food item is then understood to also include a "first end" and "second end."

Embodiments of a food-processing system and methods for operating the same are provided for increasing the speed of processing and reducing the manual intervention requirements of the method, without bursting a casing material or causing a linked strand to fall from a conveyor.

As used herein, a "first speed," "second speed," "third speed," etc. may refer to a speed level of the food-processing system based on the operating speed of the servo motors driving the components of the system or based on the speed of the material passed through the system. At the "first speed," "second speed," "third speed," etc., individual components of the food-processing system may be driven under the same or different parameters, such that the "first speed," "second speed," and "third speed" may comprise a set of individual component speeds within the system, a set of servo parameters for each component of the system, or a set of speeds of material passed through each component of the system.

The description of servo motors being "geared together" as provided in embodiments of the current disclosure may be understood as a proportional relationship between the speed of each servo motor. Accordingly, when a given servo motor changes speed additional motors geared together with said servo motor proportionally change speed. A "gear ratio" defining the proportional relationship between the individual servo motors may be adjusted for the food-processing system according to the requirements of different products, conveyor types employed by the system, or otherwise.

The embodiments of the food-processing system and related methods for operating the same according to the present disclosure advantageously allow a food-processing system to more efficiently fill a casing material with food material by enabling the food-processing system to easily and quickly adapt to changing processing constraints of the materials, thereby minimizing inefficiencies and waste inherent to more static and less responsive speeds of prior art systems.

Figure 1:
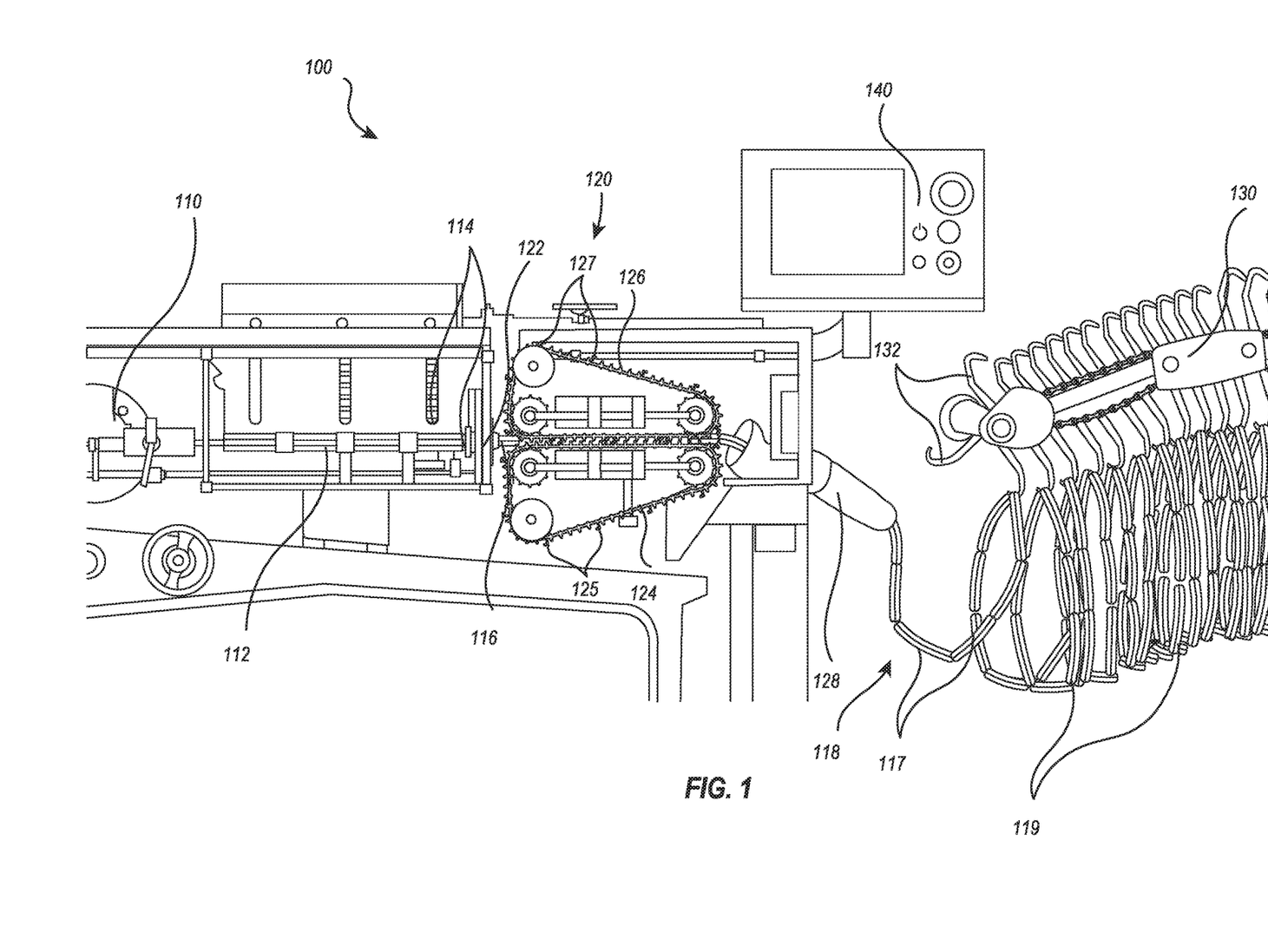
FIG. 1 is a side elevational view of an embodiment of a food-processing system according to an embodiment of the disclosure.

A food-processing system 100 according to an embodiment is shown in FIG. 1. The food-processing system 100 may include a metering pump 110, a linker 120 and a conveyor 130. The metering pump 110 may include a stuffing tube 112 configured for extending into a casing material 114 and passing an extruded food material from the metering pump 110 into the casing material 114 under an elevated pressure. In an exemplary but non-limiting embodiment the food-processing system 100 may be configured as a sausage-processing system, the extruded food material may comprise a ground meat mixture, and the casing material 114 may comprise a cellulose tube, collagen tube, alginate tube, a naturally occurring tube material such as an intestine or stomach, or any other suitable tube or casing.

The linker 120 may include a rotatable chuck 122 for receiving a filled casing material 116 therethrough and linking belts 124, 126 for conveying the filled casing material 116 from the rotatable chuck 122 to a discharge horn 128. In operation, the rotatable chuck 122 may be configured to grip the filled casing material 116 and rotate in a direction transverse to a feed direction of the filled casing material 116 at a predetermined rate.

The linking belts 124, 126 may be arranged on opposing sides of the filled casing material 116 along the feed direction and include first and second pinching elements 125, 127 arranged at predetermined intervals on the linking belts 124, 126. The first and second pinching elements 125, 127 may be configured to pinch the filled casing material 116 therebetween while feeding the filled casing material 116 along a feed direction, the rotatable chuck 122 rotating the filled casing material 116 up to the position of the first and second pinching elements 125, 127. The cooperating action of the first and second pinching elements 125, 127 and the rotatable chuck 122 may be configured to create individual links 117 in the filled casing material 116, separated by twists formed in the casing material 114 and resulting in the formation of a linked strand 118.

The linked strand 118 may be discharged from the linker 120 through the discharge horn 128 to the conveyor 130. In embodiments, the conveyor 130 may comprise a chain or belt system including a plurality of hooks 132 for hanging the linked strand 118, and the discharge horn 128 may be configured to rotate in a throwing motion for manipulating a discharge angle and throwing the linked stand 118 onto the plurality of hooks 132 in the form of loops 119. According to varying embodiments, the conveyor 130 may comprise a vertical conveyor with metal hooks, a horizontal conveyor with plastic hooks, or a continuous oven-chain conveyor with metal rod style hooks. The loops 119 may be conveyed by the conveyor 130 to a location of further processing or may be removed for manual or other transport to additional processing locations.

The food-processing system 100 may include a control unit 140 configured to control the operation of the food-processing system 100, including the metering pump 110, the linker 120, the conveyor 130 and related components. According to embodiments, the control unit 140 may include a processor, a memory, a plurality of sensors and an interface (not shown) for facilitating the monitoring and adjustment of the food-processing system 100 by a user or otherwise.

The food-processing system 100 according to FIG. 1 may be arranged to form a plurality of linked strands 118 by repeatedly filling one of a plurality of casing materials 114 with food material from the metering pump 110, forming links in the filled casing materials 116 using the linker 120, and placing the resulting linked strands 118 on the plurality of hooks 132 of the conveyor 130 sequentially in loops 119. Each linked strand 118 has a length determined by the casing material 114 and the amount of food material extruded therein, such that the processing of a single linked strand begins at a first end of the linked strand 118 and concludes at a second end of the linked strand 118, prior to the processing of a subsequent linked strand in like manner.

In the embodiment of FIG. 1, the food-processing system 100 is arranged to include a separate servo drive system, referred to hereafter as a servo, for each of a plurality of driven components of the system 100. Each servo may include a variety of parts including a servo motor, a controller, a feedback device, a servo drive, and/or any other suitable parts for forming a servo drive system. The servos of the food-processing system 100 may be geared together, having their individual operation synchronized, and forming a motor control system 200 illustrated in FIG. 2 for implementation in the food-processing system 100.

Figure 2:
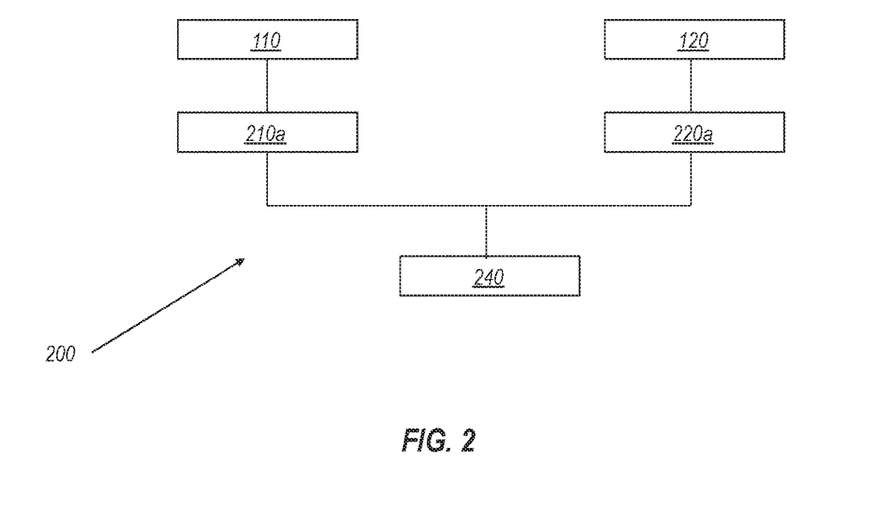
FIG. 2 is a simplified diagram of a motor control system according to an embodiment of the disclosure.

The motor control system 200 of FIG. 2 may include at least a metering pump servo 210a configured for driving the metering pump 110 and a linker servo 220a configured for driving the linker 120. The metering pump servo 210a and the linker servo 220a may be geared together, having their individual operation synchronized, such that the servos 210a, 220a can run through a speed ramp-up uniformly and with high precision. In the embodiment of FIG. 2, each of the servos 210a, 220a are connected to a control unit 240 in order to facilitate synchronization and control of the servos 210a, 220a and related components.

The combination of at least the metering pump servo 210a and the linker servo 220a according to embodiments of the current disclosure allows the food-processing system 100 to operate a two-step ramp-up that is configurable to individual requirements of different food materials, casing materials, and conveyor systems. Each of the servos 210a, 220a may be configured to closely follow the two-step ramp-up, increasing control and uniformity of the food-processing system 100.

Figure 3A:
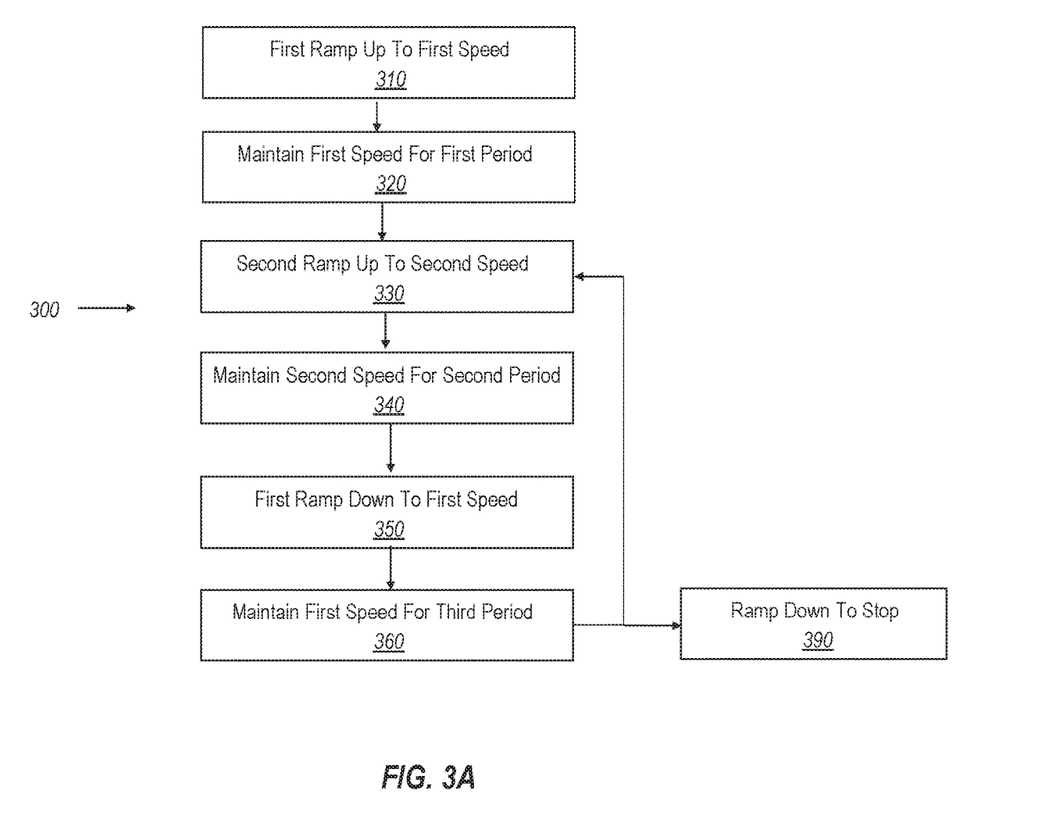
FIG. 3A is a simplified flow diagram of a method for processing an elongated strand of food material according to an embodiment of the disclosure.

A method for operating the food-processing system 100 using a two-step ramp-up 300 is illustrated in FIG. 3A. The method 300 may include a first ramp-up 310 of at least the metering pump 110 and the linker 120 to a first speed in a synchronized manner for the beginning of a linked strand 118. This first speed is advantageously maintained during a first period 320. In an example, maintaining the first speed during the first period 320 may comprise maintaining the first speed for a time period from engaging the stuffing tube 112 with the casing material 114 until a first end of the linked strand 118 is discharged to the conveyor 130 and laid thereon, such that a momentum of the first end is maintained at a controllable level for preventing flailing or bouncing of the first end of the linked strand 118 off of the conveyor 130 and for enabling a precise control of the placement of the first end of the linked strand 118 on the conveyor 130 (e.g. controlling the length of the first end hanging from a first hook or controlling an initial contact point between the first end and the conveyor).

A second ramp-up 330 may then commence from the first speed to a second speed higher than the first speed. The second speed may advantageously be maintained during a second period 340, allowing the system to run at higher speeds while processing subsequent links than would be possible when processing the first end of the linked strand 118. The subsequent links are restricted by the first end and the second end of the linked strand 118 being located in the linker 120 and/or on the conveyor 130, such that the subsequent links are more stabilized than the ends of the linked strand 118 and are less susceptible to bouncing and/or falling from the conveyor 130.

Likewise, the pressure applied by the metering pump 110 to the casing material 114 is stabilized after the initial extrusion of food material, such that the subsequent links are less susceptible to bursting.

The two-step ramp-up 300 according to the current disclosure overcomes the limitations of processing the first end of the linked strand 118 by allowing the system 100 to fill the first end of the linked strand 118 and discharge the first end of the strand 118 to the conveyor 130 without difficulty at the first speed, an initial speed, prior to increasing the speed of the system to the second speed, such as a full speed. The first speed may be configured to a magnitude allowing for increased control of the first end of the linked strand as it is discharged from the linker 120, and allowing for a gradual increase in pressure against the casing material in the first end of the linked strand by the food material extruded from the metering pump 110.

The two-step ramp-up 300 may further include a first ramp-down 350 from the second speed to the first speed. The first speed may be advantageously maintained during a third period 360. In an example, the maintaining the first speed for a third period 360 may comprise a time period for filling a predetermined number of links in the second end of the casing material 114 and for discharging the second end of the linked strand 118 to the conveyor 130. Maintaining the first speed during the third period 360 keeps a momentum of the second end at a controllable level for preventing flailing or bouncing of the second end of the linked strand 118 off of the conveyor 130, and may reduce an overpressure in the second end of the linked strand 118 such that leakage of food material from the casing material 114 and the stuffing tube 112 upon disengaging the stuffing tube 112 and the casing material 114 is reduced.

The benefit of the two-step ramp-up of the servos in the system 100 may be advantageously increased by the second period 340 being greater than the first period 320 and/or by the second period 340 being greater than the third period 360. According to an embodiment, the second period 340 may be greater than the combination of the first period 320 and the third period 360.

Configurations of the first period 320, the second period 340, and the third period 360 according to the current disclosure increase an overall throughput and speed of the processing system by allowing the system to operate at a sustained second speed which may be higher than would be acceptable for processing the first end and/or the second end of the linked strand, while also operating at a sustained first speed that is low enough to be acceptable during processing of the first end and the second end of the linked strand. An "acceptable speed" as referenced is understood as a speed that does not result in a pronounced casing failure rate or looping failure rate, as varies according to the materials used and would be understood by one of ordinary skill in the art according to the teachings of the disclosure.

Figure 3B:
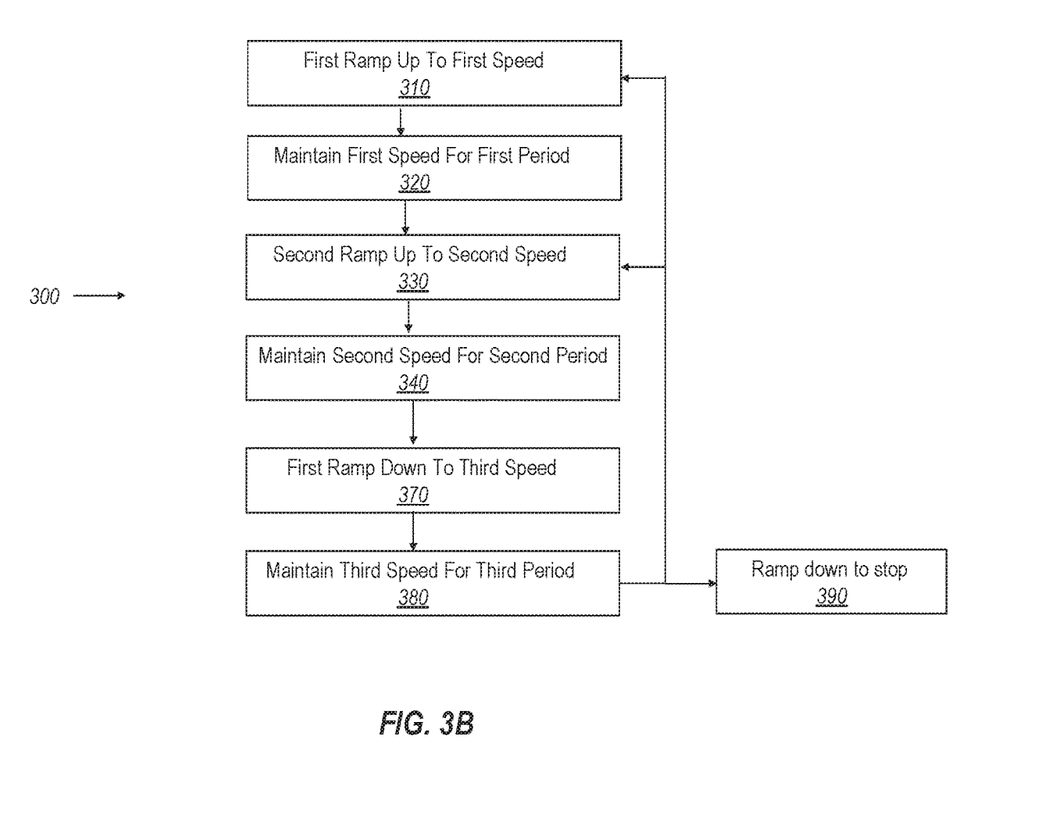
FIG. 3B is a simplified flow diagram of a method for processing an elongated strand of food material according to an embodiment of the disclosure.

According to an alternative, the method 300 may include a third speed for use in the third period, as shown in FIG. 3B. Here, the method proceeds according to the embodiment of FIG. 3A through step 340 and varies in that the first ramp-down is from the second speed to a third speed 370. The third speed may be higher or lower than the first speed, as required by the processing materials or the type of conveyor used in the method but is preferably lower than the second speed. The third speed may be different than the first speed in a case where the speed needed to control the second end is different from the speed needed to control the first end or the speed needed to prevent bursting the first end. The third speed may then be maintained 380 for the third time period, similar to step 360 of FIG. 3B.

In either embodiment according to FIG. 3A or 3B, the food-processing system 100 may be configured to process a subsequent linked strand by proceeding to ramp-up to a second speed according to step 330. In the method of FIG. 3B, an additional step may be added to ramp-up or down from the third speed to the first speed. Alternatively, the system 100 may initiate a second ramp-down to a stop 390 in either embodiment.

Figure 4A:
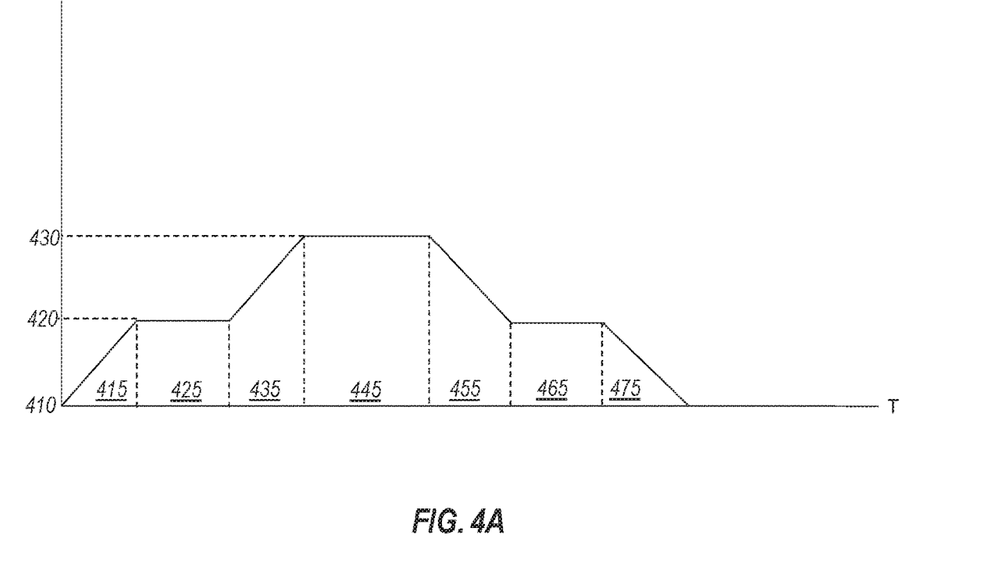
FIG. 4A is a simplified motion profile for a food-processing system according to an embodiment of the disclosure.

FIG. 4A illustrates a simplified motion profile of an embodiment of the food-processing system according to the method of FIG. 3A, where velocity V represents the speed and time T represents the periods of the food-processing system. As illustrated, the two-step ramp-up of the servos initiates from a stopped position 410 and accelerates during a first ramp-up period 415 to the first speed 420. The first speed 420 may be maintained for a predetermined time during a first period 425, as explained in the method of FIG. 3. At the conclusion of the first period 425, acceleration to the second speed 430 occurs for a second ramp-up period 435. The second speed 430 is advantageously maintained during a second period 445, allowing the system to run at higher speeds.

At the conclusion of the second period 445, deceleration to the first speed 420 occurs for a first ramp-down period 455 and the first speed 420 is maintained during a third period 465 for completing processing of the second end of the linked strand 118. As explained in the method of FIG. 3A, a period 475 may be used as a ramp-down period to bring the system to a stop 410.

Figure 4B:
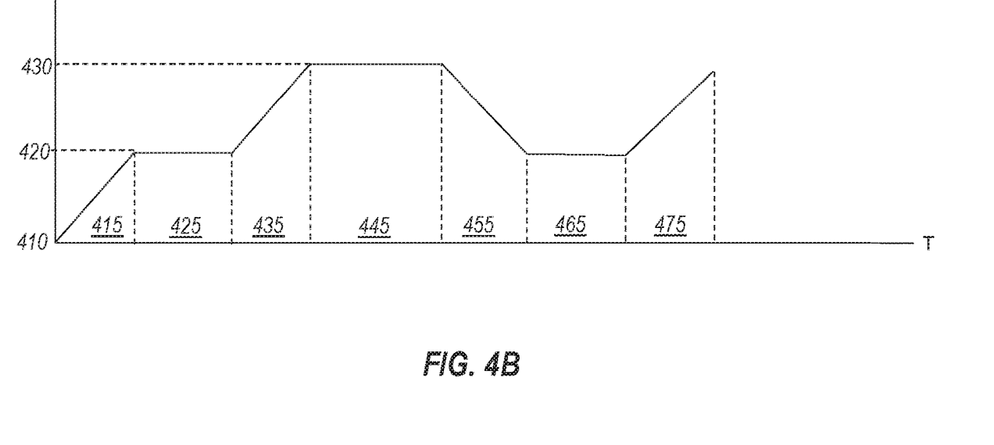
FIG. 4B is a simplified motion profile for a food-processing system according to an embodiment of the disclosure.

In an alternative embodiment shown in FIG. 4B, a period 475 may be correspond to a return to the second ramp-up 435 to the second speed in order to continue operation of the system, such as with a new empty casing material to fill.

According to embodiments, slope and/or amplitude of the two-step ramp-up may be configured to be different for different products, conveyor systems, or other processing requirements. For example, a length of the first ramp-up period 415 may be increased to accommodate the limitations of a particularly weak casing material or decreased in the case of a stronger casing material, thereby changing the slope of the first ramp-up period 415.

In yet further embodiments, the magnitude of the speeds and the slope of the ramp-up and ramp-down periods may be adjusted based on the viscosity or other properties of the food material. A magnitude of the first speed 420 and the second speed 430 may be adjusted to the strength of a particular casing material and/or the requirements of a particular conveyor receiving the linked strand, with or without affecting the slope of the ramp-up or ramp-down periods.

While a method of operating a food-processing system involving distinct first and second operating speeds with corresponding ramp-up and ramp-down periods has been depicted and described, it will be understood that the system and method may be adapted to additional speeds and additional ramp-up and ramp-down periods of any suitable length, magnitude, and slope. Accordingly, the two-step ramp-up described herein may be adapted to additional speeds and additional ramp-up and ramp-down periods and may comprise a stepwise ramp-up and/or ramp down including at least two steps. The slope of the ramp-up and ramp-down periods may or may not be constant, according to the features of the products and the conveyor systems used, such that a rate of acceleration or deceleration may change during the ramp-up and ramp-down periods, forming a curved ramp-up or ramp-down period instead of a straight line as shown in FIGS. 4A-4B.

The operation of at least the metering pump 110 and the linker 120 by separate servos 210a, 220a that are geared together in a synchronized manner further achieves the advantage that the weight of the links 117 remain substantially uniform throughout the two-step ramp-up as the speed goes from a stopped state to the first speed 420 and then up to the second speed 430 and/or back down. Any change in speed may be applied uniformly and precisely to each servo motor such that every step of the system forming the linked strand is performed at an identical rate, increasing the consistency of the system and method of the disclosure.

Figure 5:
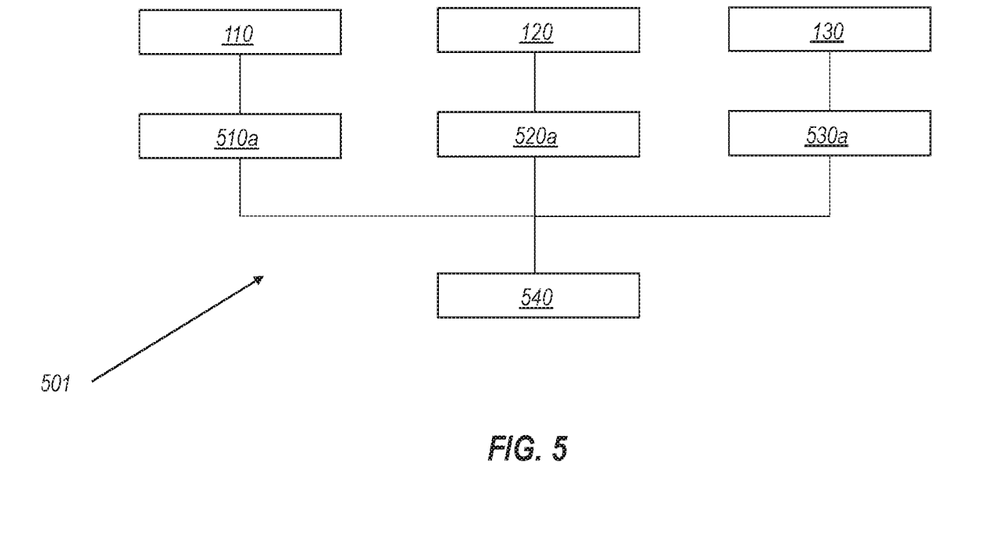
FIG. 5 is a simplified diagram of a motor control system according to an embodiment of the disclosure.
Figure 6:
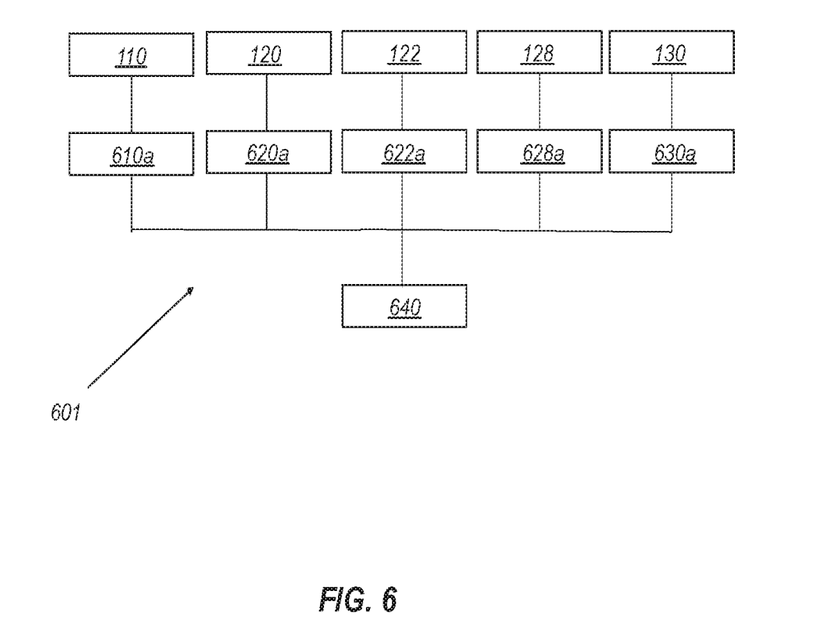
FIG. 6 is a simplified diagram of a motor control system according to an embodiment of the disclosure.

Additional embodiments of a food-processing system may include additional servos for driving the individual components of the system according to the particular requirements of a given food-processing system, such as illustrated in the variations of motor control system embodiments of FIGS. 5-6.

As shown in FIG. 5, a motor control system 501 may include a metering pump servo 510a configured for driving the metering pump 110, a linker servo 520a configured for driving the linker 120, and a conveyor servo 530a configured for driving the conveyor 130. Each of the servos 510a, 520a, 530a may be geared together, having their individual operation synchronized, such that the servo motors can run through a speed ramp-up uniformly and with high precision. In the embodiment of FIG. 5, each of the servos 510a, 520a, 530a are connected to a control unit 540 in order to facilitate synchronization and control of the servos 510a, 520a, 530a and related components.

According to the embodiment of FIG. 6, a motor control system 601 may include a metering pump servo 610a configured for driving the metering pump 110, a linker servo 620a configured for driving the linking belts 124, 125, a rotatable chuck servo 622a configured for driving the rotatable chuck 122, a discharge horn servo 628a configured for driving the discharge horn 128, and a conveyor servo 630a configured for driving the conveyor 130, or any combination of the same. Each of the servos 610a, 620a, 622a, 628a, 630a may be geared together, having their individual operation synchronized, such that the servo motors can run through a speed ramp-up uniformly and with high precision. In the embodiment of FIG. 6, each of the servos 610a, 620a, 622a, 628a, 630a are connected to a control unit 640 in order to facilitate synchronization and control of the servos 610a, 620a, 622a, 628a, 630a and related components.

In embodiments according to the current disclosure, the servo motor of the metering pump 210a, 510a, 610a may be configured to perform a run-back of the stuffing tube 112 upon filling the casing material to a desired level and prior to disengaging from a second end of a filled casing material 114, to reduce or substantially eliminate any overpressure in the stuffing tube 112 and/or the second end of the filled casing material 114. The run-back may comprise reversing the metering pump 110 and/or the stuffing tube 112 in an amount equivalent to a few gear teeth of the devices, for example less than five gear teeth.

It is to be understood that the advantages of the current disclosure cannot be achieved using a variable-frequency drive motor to drive the described components as in the prior art. As such, a food-processing system according to the current disclosure may exclude the use of any variable-frequency drive motor, at least in the operation of a metering pump and a linker or in the operation of a metering pump, a linker and a conveyor. Similarly, while the servos of the food-processing system may be geared together for synchronized operation, no electrical coupling may be required between the various components of the disclosed food-processing systems to facilitate communication between various components.

Figure 7A:
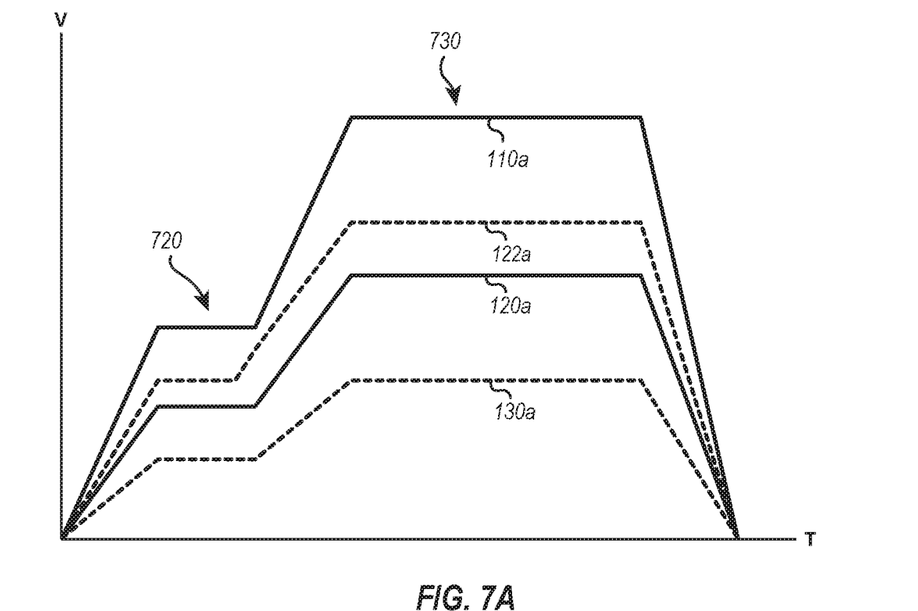
FIG. 7A is a simplified motion profile for individual components of a food processing system according to an embodiment of the disclosure.
Figure 7B:
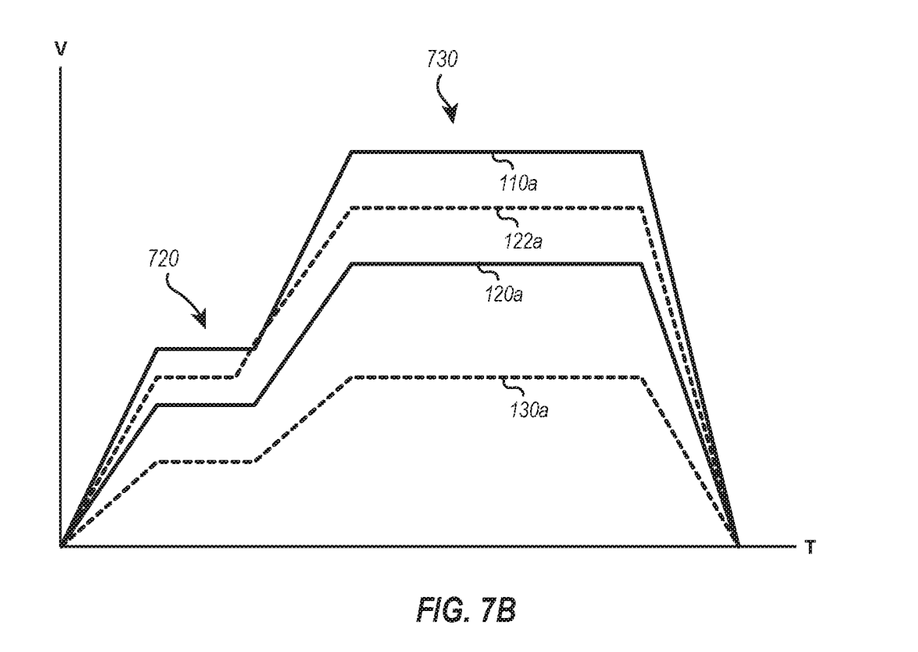
FIG. 7B is a simplified motion profile for individual components of a food processing system according to an embodiment of the disclosure.

In the comparative ramp-up examples of FIGS. 7A and 7B, a first speed 720 and a second speed 730 each include a set of operating speeds, including a distinct operating speed for each of a plurality of driven components provided with servo motors, including a metering pump 110a, a linker 120a, and a conveyor 130a. As illustrated in FIGS. 7A and 7B, the metering pump 110a, the linker 120a, and the conveyor 130a may be geared together such that a servo motor of each component changes operating speed proportionally to one another in a synchronized manner, the proportional relationship between the distinct operating speeds defining a gear ratio of the system.

A gear ratio of the example in FIG. 7A differs from a gear ratio of the example in FIG. 7B due to a variation in an operating speed of the metering pump 110a corresponding to the first speed 720 and the second speed 730 of the system, wherein operating speeds of the linker 120a and the conveyor 130a corresponding to the first speed 720 and second speed 730 of the system are constant between the examples. The variation in the operating speed of the metering 110a pump corresponding to the first speed 720 and the second speed 730 of the system, such as by a decrease in the speed of the metering pump 110a in the embodiment of FIG. 7B relative to the embodiment of FIG. 7A, comprises a change in gear ratio. In one example, a change from the gear ratio of the embodiment of FIG. 7A to the gear ratio of the embodiment of FIG. 7B may be made to reduce the amount of food material provided to the casing material by the metering pump 110a, resulting in a smaller or a thinner product.

The embodiments of FIGS. 7A and 7B further include a rotatable chuck 122a driven by a variable-frequency drive motor, such that the rotatable chuck 122a requires a ramp-up and/or ramp-down distinct from the servo motor driven components of the food-processing system due to the reduced responsiveness of the variable-frequency drive motor. The use of a variable-frequency drive motor for driving the rotatable chuck 122a, or similar accessory components, may be acceptable in some embodiments due to the reduced coordination required for operation of such components relative to, the metering pump 110a, the linker 120a, and the conveyor 130a.

For example, the rotatable chuck 122a may be required to initiate a ramp-up prior to a ramp-up of, the metering pump 110a, the linker 120a, and the conveyor 130a in order to compensate for the reduced responsiveness of the variable-frequency drive motor relative to servo motors. Due to the metering pump 110a and the linker 120a controlling the size of the links formed in the strand, an increase in twisting speed relative to the remaining operations of the system may have a minimal impact on the finished product, as long as sufficient twisting occurs to divide the links formed in the strand. In other words, an effect of an increased speed of the rotatable chuck 122a relative to the other components, and a decreased coordination therewith, may be negligible when appropriately selected, as would be understood by one of ordinary skill in the art from the teachings of the present disclosure.

The features of the ramp-up illustrated in FIGS. 7A and 7B and described above may be similarly applied to a ramp-down, as described with respect to FIGS. 4A and 4B. As such, it will be understood that the system and method described in the present disclosure may be adapted to additional speeds and more or less ramp-up and ramp-down periods of any suitable length, magnitude, and slope.

In embodiments, the separate servo motors according to the motor control systems 200, 501, 601 may facilitate an accurate count of pitches of the individual components by the control unit 140. In embodiments, the count of pitches by the control unit may be used to track the linker movement and the conveyor movement based on the particular requirements of a given product type. Accordingly, the number of pitches needed to account for an operating gap between the completion of a second end of a first linked strand and beginning of a first end of a second linked strand can be accurately calculated.

In an embodiment having a separate servo motor 628*a* for the discharge horn 128, the calculated number of pitches may be used to halt or introduce a negative movement for the discharge horn 128 to compensate for the operating gap prior to the conveyor, such that movement of the conveyor 130, such as movement based on the tracking of the discharge horn by an encoder, is prevented during the operating gap.

Due to the servo connection between the linking belts 124, 126 and the discharge horn 128, the discharge horn 128 can be controlled to move relative to the linking belts 124, 126 to allow the linking belts to run while the discharge horn 128 "stalls" at the beginning and end of a linked strand 118. The servo connection between the linking belts 124, 126 and the discharge horn 128 thus ensures a correct phasing between the conveyor 130 and the linked strand 118, such that the linked strand 118 is appropriately discharged to the conveyor 130.

The improved synchronization of the metering pump, the linker, the discharge horn and the conveyor advantageously eliminates the prior art drawback of gaps or empty hooks between linked strands, allowing for an increased volume of linked strands on the conveyor of 2% or 3% without manual intervention by an operator.

In an embodiment of the disclosure, the processing system 100 may be configured to receive a measured weight of product from an operator at an interface of the control unit 140. The control unit 140 may be configured to precisely adjust the metering pump speed at the metering pump servo motor to achieve a correct weight based on the measured weight automatically without altering the speeds of additional components. This arrangement advantageously eliminates the need for electrically coupling the components of the processing system and reduces the management requirements of an operator while improving the accuracy of the product weight.

It is to be understood that not necessarily all objects or advantages may be achieved under any embodiment of the disclosure. Those skilled in the art will recognize that the disclosed food-processing system and related methods may be embodied or carried out in a manner that achieves or optimizes one advantage or group of advantages as taught without achieving other objects or advantages as taught or suggested.

The skilled artisan will recognize the interchangeability of various disclosed features. Besides the variations described, other known equivalents for each feature can be mixed and matched by one of ordinary skill in this art to make or use a food-processing system and related methods under principles of the present disclosure. It will be understood by the skilled artisan that the features described may be adapted to other types of food materials and processes.

Although this disclosure describes certain exemplary embodiments and examples of a food-processing system and related methods, it therefore will be understood by those skilled in the art that the present disclosure extends beyond the specifically disclosed embodiments to other alternative embodiments and/or uses of the disclosure and obvious modifications and equivalents thereof. It is intended that the present disclosure should not be limited by the particular disclosed embodiments described above.

The invention claimed is:

1. A method for processing an elongated strand of food material, comprising:
   synchronously initiating a first ramp-up of a metering pump, a linker, and a conveyor to a first speed using a metering pump servo, a linker servo, and a conveyor servo, respectively;
   maintaining the first speed of the metering pump and the linker for a first time period;
   synchronously initiating a second ramp-up of the metering pump and the linker from the first speed to a second speed higher than the first speed using the metering pump servo and the linker servo; and
   maintaining the second speed of the metering pump and the linker for a second time period,
   wherein maintaining the first speed of the metering pump and the linker during the first time period includes:
   the metering pump forming a filled casing strand by extruding food material into a casing material;
   the linker forming links in the filled casing strand;
   the linker depositing a first link of a linked strand on the conveyor; and
   maintaining said first speed from engaging a stuffing tube with the casing material until a first end of the linked strand is discharged to the conveyor and laid thereon.

2. The method according to claim 1, wherein the second time period is greater than the first time period.

3. The method according to claim 1, wherein the step of synchronously initiating the second ramp-up of the metering pump and the linker begins after the linker deposits the first link on the conveyor.

4. The method according to claim 3, wherein during the second time period:
   the metering pump forming the filled casing strand by extruding the food material into the casing material;
   the linker forming links in the filled casing strand; and
   the linker depositing a second link of the linked strand on the conveyor.

5. The method according to claim 4, wherein the second link is connected to the first link on the linked strand.

6. The method according to claim 4, wherein a weight of the second link and a weight of the first link are substantially equal.

7. The method according to claim 1, further comprising:
   synchronously initiating a first ramp-down of the metering pump and the linker from the second speed to the first speed using the metering pump servo and the linker servo;
   maintaining the first speed of the metering pump and the linker for a third time period; and
   synchronously initiating a second ramp-down of the metering pump and the linker from the first speed to a stop using the metering pump servo and the linker servo.

8. The method according to claim 7, wherein during the third time period:
   the metering pump forming a filled casing strand by extruding a food material into a casing material;
   the linker forming links in the filled casing strand; and the linker depositing a third link of a linked strand on a conveyor; and wherein the third link comprises a terminal end of the linked strand that is free of the linker after the second ramp-down of the metering pump and the linker.

9. The method according to claim 7, wherein during the third time period:

the metering pump forming a filled casing strand by extruding a food material into a casing material and subsequently reducing pressure in the metering pump by initiating a run-back of the metering pump.

10. The method according to claim 1, wherein the synchronous initiation of the first ramp-up and the synchronous initiation of the second ramp-up includes ramping-up a discharge horn and a conveyor with the metering pump and the linker, using a discharge horn servo and a conveyor servo.

11. The method according to claim 1, wherein the conveyor comprises a plurality of hooks; and the linker depositing the first link of the linked strand on the conveyor by forming a loop of the linked strand on a hook of the conveyor.

12. The method according to claim 11, wherein during the second time period:

the metering pump forming the filled casing strand by extruding the food material into the casing material;

the linker forming links in the filled casing strand; and the linker depositing a second link of the linked strand on the conveyor by forming a subsequent loop of the linked strand including the second link on a subsequent hook of the conveyor.

* * * * *